United States Patent
Caridis et al.

(10) Patent No.: US 10,368,550 B2
(45) Date of Patent: Aug. 6, 2019

(54) ROLLER SYSTEM FOR LAMINATED PRODUCTS

(71) Applicant: Heat and Control, Inc., Hayward, CA (US)

(72) Inventors: Andrew Anthony Caridis, San Carlos, CA (US); Leopoldo Zarate Andrade, Tlajomulco de Zuñiga (MX); Sergio Gonzalez Granados, Tlaquepaque (MX); Miguel Angel Gomez Angulo, Zapopan (MX); Mario Lorenzana Saucedo, Tlaquepaque (MX)

(73) Assignee: Heat and Control, Inc., Hayward, CA (US)

( * ) Notice: Subject to any disclaimer, the term of this patent is extended or adjusted under 35 U.S.C. 154(b) by 10 days.

(21) Appl. No.: 15/536,849

(22) PCT Filed: Nov. 4, 2015

(86) PCT No.: PCT/IB2015/058531
§ 371 (c)(1),
(2) Date: Jun. 16, 2017

(87) PCT Pub. No.: WO2016/097894
PCT Pub. Date: Jun. 23, 2016

(65) Prior Publication Data
US 2017/0347670 A1    Dec. 7, 2017

(30) Foreign Application Priority Data
Dec. 19, 2014    (MX) .................. MX/a/2014/016071

(51) Int. Cl.
*A21C 3/06* (2006.01)
*A21C 14/00* (2006.01)

(52) U.S. Cl.
CPC ................ *A21C 14/00* (2013.01); *A21C 3/06* (2013.01)

(58) Field of Classification Search
CPC .................................. A21C 3/06; A21C 14/00
See application file for complete search history.

(56) References Cited

U.S. PATENT DOCUMENTS 3,290,859 A    12/1966    Talbot
3,704,664 A    12/1972    Fisher, Jr.
(Continued)

FOREIGN PATENT DOCUMENTS

DE    26 03 169 A1    9/1976
DE    29 09 296 A1    9/1980
(Continued)

*Primary Examiner* — James P Mackey

(57) ABSTRACT

A roller system laminates products in different shapes of any type of mass and/or combination thereof, for obtaining different rolled tri-dimensional shapes, to be later baked and/or fried. A roller system comprises a horizontal conveyor belt, set on the upper part of a main support structure, which receives laminated products and conveys them in a first direction at a first velocity towards a start roller belt; said start roller belt which is perpendicular to the horizontal conveyor belt, is set over a second mobile support structure, to begin the rolling of the laminated products at a second velocity and in a second direction, said start roller belt transports the laminated products with the rolling having started towards a rolling belt; the rolling belt on an inclined plane under the horizontal conveyor belt.

22 Claims, 6 Drawing Sheets

(56) References Cited

U.S. PATENT DOCUMENTS

| | | | |
|---|---|---|---|
| 4,116,120 A | | 9/1978 | Kemper |
| 5,018,439 A | * | 5/1991 | Bordin .................... A21C 3/06 425/321 |
| 5,078,585 A | * | 1/1992 | Morikawa ................ A21C 3/06 425/162 |
| 6,659,755 B1 | | 12/2003 | Bonnet et al. |
| 2006/0107846 A1 | | 5/2006 | Foulon, Jr. et al. |
| 2012/0308693 A1 | | 12/2012 | Van Blokland |

FOREIGN PATENT DOCUMENTS

| | | |
|---|---|---|
| EP | 0084509 A1 | 7/1983 |
| EP | 0 962 141 A1 | 12/1999 |
| FR | 2 692 757 A1 | 12/1993 |
| JP | S58 205455 A | 11/1983 |
| JP | WO 2005/065462 A1 | 7/2005 |
| MX | 04000037 A | 12/2005 |

\* cited by examiner

ROLLER SYSTEM FOR LAMINATED PRODUCTS

BACKGROUND OF THE INVENTION

Field of Invention

The present invention refers to a roller system for laminated products which present different shapes of any type of mass and/or a combination of them, with the end goal of obtaining different rolled tri-dimensional shapes, to be baked and/or later fried.

Related Art

The rolling methods which exist in the industry, only allow rolling the laminated shape, without having the possibility of obtaining an open rolling or of being able to control the rolling degree of the laminated shape, so that this always remains closed and cannot generate different shapes with the same feeding directions and laminated shape. These types of methods are very limited in so far as the laminated shapes which can be developed, given that the rolling is carried out through belt sections placed in a vertical manner, and which rest over a horizontal belt which is what actually feeds the laminated shapes towards the oven.

The present invention is different from those which already exist in the state of the art given its flexibility to carry out the rolling of laminated products in different directions, but mainly in the ability to control that which is closed or open or the rolling of the laminate product to be fed, as well as freeing the rolling at a desired point to allow achieving different rolled shapes with the same laminated figure to be rolled.

SUMMARY OF THE INVENTION

The invention provides a roller system for laminated products, comprising a horizontal conveyor belt set on an upper part of a main support structure for receiving and conveying laminated products, a first roller belt which is set over a second mobile support structure and perpendicular to the horizontal conveyor belt for receiving laminated products from the horizontal conveyor belt and partially rolling them, a second roller belt set on a third mobile support structure in an inclined plane under the horizontal conveyor belt for receiving partially rolled laminated products from the first roller belt and further rolling them, and a horizontal unloading belt set on a lower part of the main support structure for unloading rolled products from the second roller belt.

BRIEF DESCRIPTION OF FIGURES

The illustrative embodiment may be described referencing the accompanying figures, which refer to.

BRIEF DESCRIPTION OF THE INVENTION

Figure 1:
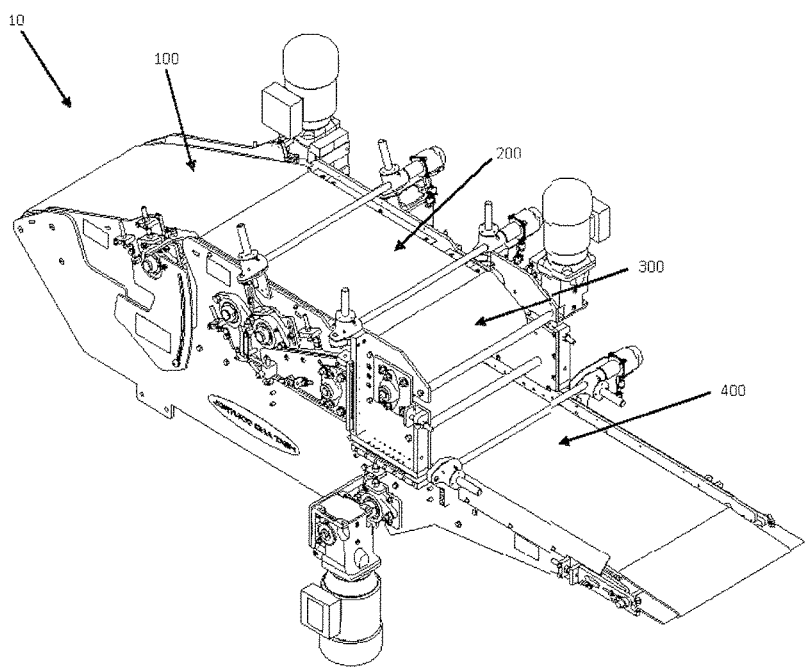
FIG. 1 shows an isometric view of the roller system for laminated products of present invention.
Figure 2:
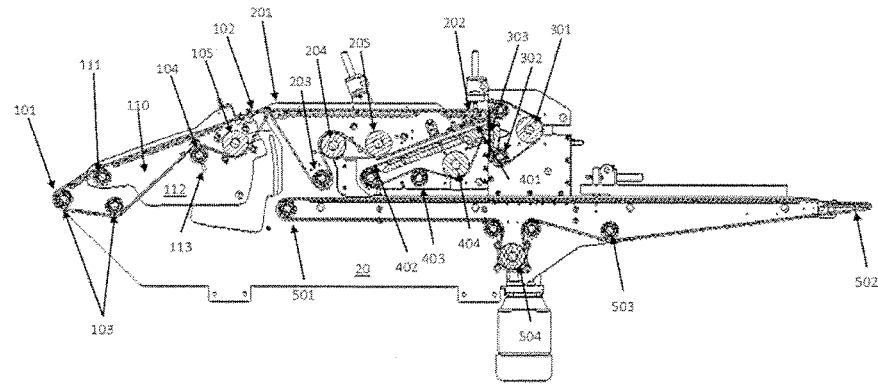
FIG. 2 shows a longitudinal cut of the roller system for laminated products of present invention.
Figure 3:
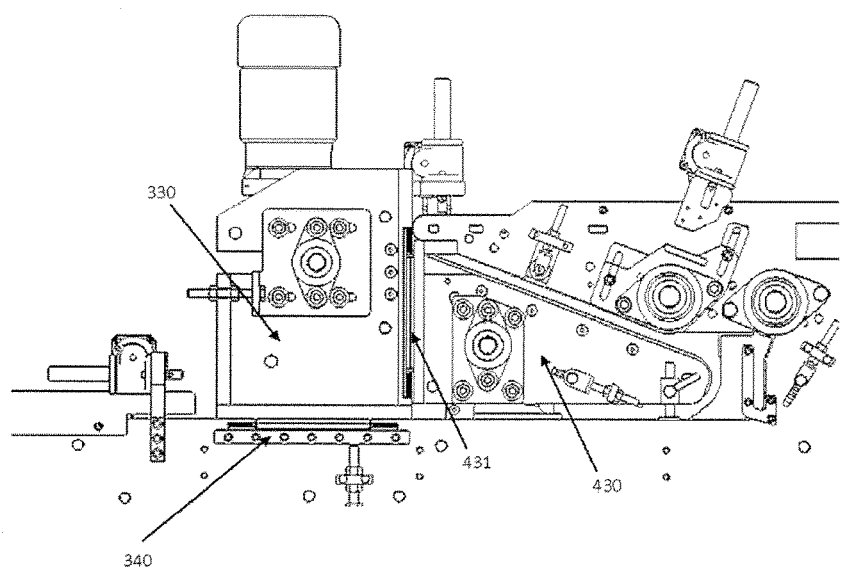
FIG. 3 shows detail of the guiding rails for the start roller belt and for the roller belt of the roller system for laminated products of present invention.
Figure 4:
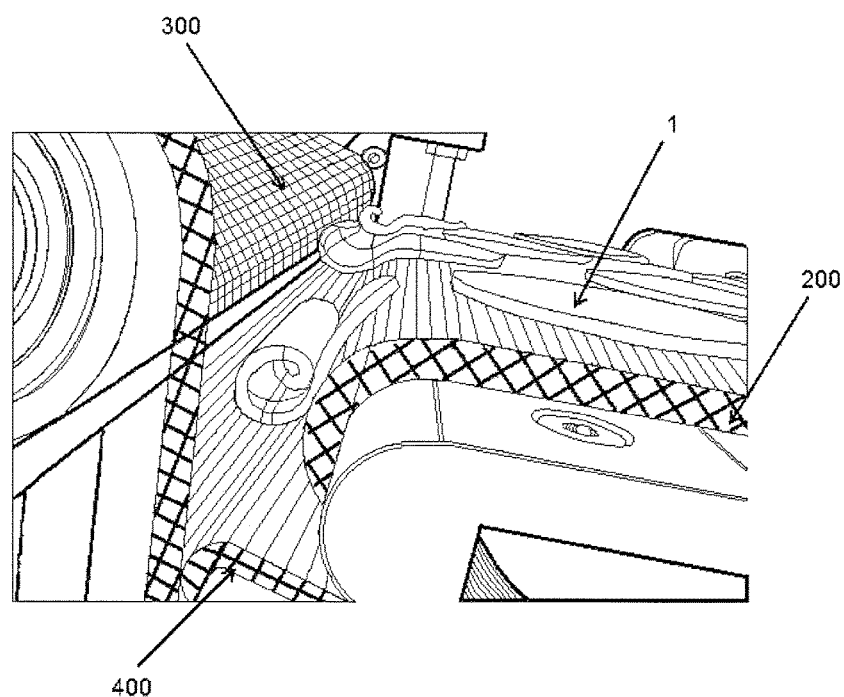
FIG. 4 shows the transference of laminated products from the conveyor belt towards the start roller belt.
Figure 5:
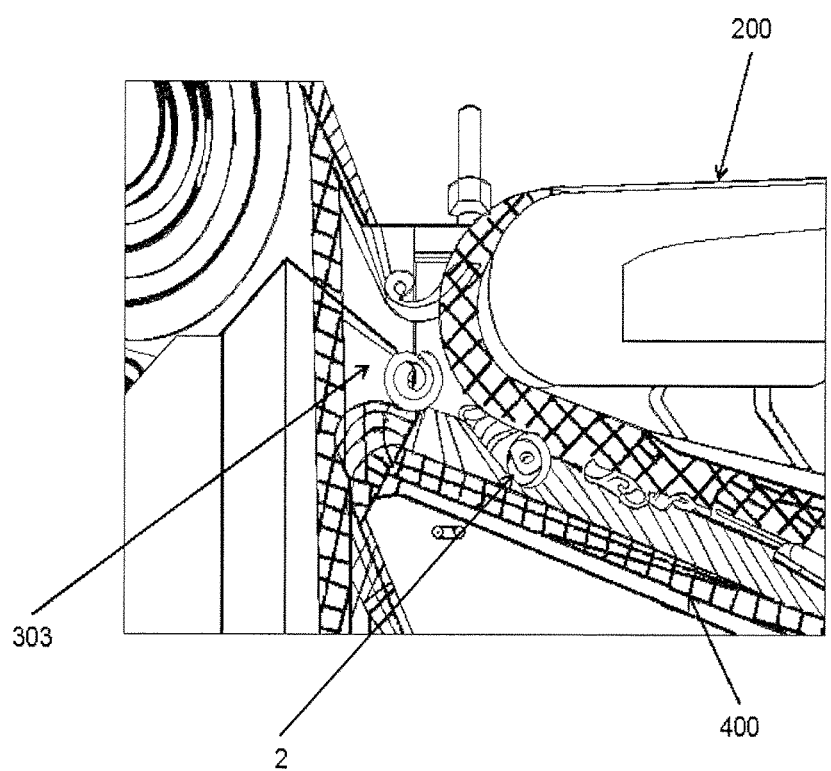
FIG. 5 shows the rolling of the laminated products undertaken from the start roller belt and the roller belt.
Figure 6:
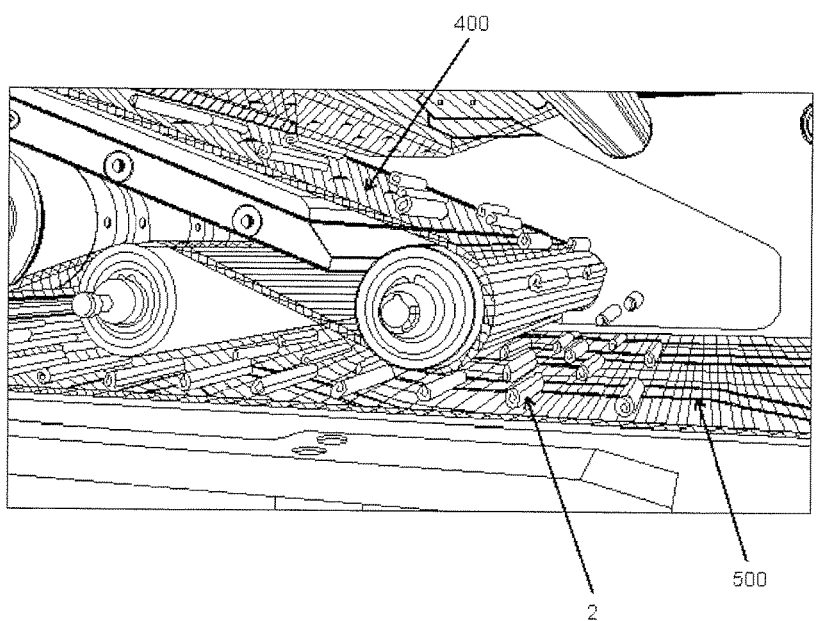
FIG. 6 displays the unloading of the rolled products from the roller belt towards the unloading belt.

The following description is made referencing FIGS. 1 through 6 indistinctively.

The present invention refers to a roller system (10) for laminated products (1) based on any type of mass and/or combination thereof. Said roller system (10) is set over a main support structure (20).

The roller system (10) presents a feeding belt (100), which itself presents an entrance end (101) and an exit end (102), said feeding belt (100) is partially mounted unto a first mobile support structure (110), the feeding belt (100) presents a tilting movement at the exit end (102), in such a way that the first support structure presents a pivot (111) near the entrance end (101) of the feeding belt (100), in such a way that the first support structure (110) moves in accordance to the main support structure (20), said feeding belt (100) presents a plurality of tracking rollers (103), one tension roller (104) and one driver roller (105), the tension roller (104) and the driver roller (105) are set on the first support structure (110), while the tracking rollers (103) are distributed between the first support structure (110) and the main support structure (20); said tension roller (104) is displaced vertically within a groove (113) set unto a lateral wall (112) of the first support structure (110).

The exit end (102) of the feeding belt (100) is in communication with an entrance end (201) of a conveyor belt (200) preferably mounted on a horizontal plane on the upper end of the main support structure (20), said conveyor belt (200) presents an exit end (202) opposite to the entrance end (201), a plurality of tracking rollers (203), a tension roller (204) and one driver roller (205), the tension roller (204) is displaced angularly to be able to tense the conveyor belt (200) and ensure its proper functioning in this way, said displacement is carried out preferably by means of a first servomotor.

The exit end (202) of the conveyor belt (100) is in communication with the working surface (303) of a start roller belt (300) set on a vertical plane, in such a way that it is perpendicular to the conveyor belt (200), said start roller belt (300) comprises a driver roller (301) and at least two tracking rollers (302); said start roller belt (300) has the ability to displace itself at a velocity and/or in a direction different from those of the conveyor belt (200), the above in order to achieve different types of rolling on the laminated products (1), said start roller belt (300) is mounted on a second mobile support structure (330), said second mobile support structure (330) is supported on a longitudinal guide rail (340) set over the main support structure (20) to longitudinally move the start roller belt (300) in relation to the conveyor belt (200), in such a way that said start roller belt is able to approach/distance itself from the conveyor belt (200), this adjustment allows achieving the desired aperture on the rolling product (2), this adjustment is crucial to achieve the rolling of the product, and it is undertaken, preferably by means of a second servomotor.

A rolling belt (400) set on an inclined plane which presents an entrance end (401) and an exit end (402), the roller belt (400) comprises a plurality of tracking rollers (403), a tensioning-drive roller (404); the entrance end (401) is at a higher point in relation to the exit end (402), similarly, said entrance end (401) is below the exit end (102) of the conveyor belt (200) and in close proximity to the working surface (301) of the start roller belt (300); said roller belt (400) is mounted over a third mobile support structure (430) which is mounted over a vertical guide rail (431), said vertical guide rail (431) is mounted over the second mobile support structure (330), in such a way that said roller belt (400) moves vertically in relation to the start roller belt (300), this adjustment allows approaching or distancing the roller belt to the return of the discharging belt (500). This adjustment allows ensuring and maintaining the desired aperture on the rolling product (2) and is carried out preferably by means of a third servomotor.

Given that the third and second mobile support structures (430, 330) are connected, upon approaching/distancing the start roller belt (300) of the conveyor belt (200), consequently the roller belt (400) also approaches/distances itself longitudinally from/to second mobile support structure (330) of said conveyor belt (200), so that said roller belt (400) has two movements, a vertical movement and a longitudinal movement.

An unloading belt (500) which receives the laminated product (1) once it has been rolled from the rolling belt (400), which additionally feeds the rolled product (2) to the next step of the process, whether it is to be baked or fried. Said belt comprises an entrance end (501), an exit end (502), a plurality of tracking rollers (503) and a tensioning-drive roller (505), said unloading belt is mounted on the main support structure (20).

Alterations to the structure described in the present would be able to be foreseen by those persons skilled in the art. However, it must be understood that the present description is related with the preferred embodiments of the invention, which is merely for illustrative purposes only, and must not be understood as a limitation of the invention. All obvious embodiments within the spirit of the invention, such as changes to the shape, material and sizes of the elements which make up the invention, must be considered as lying within the scope of the attached claims.

The invention claimed is:

1. A roller system for laminated products, comprising a horizontal conveyor belt, set on an upper part of a main support structures for receiving and conveying laminated products, a first roller belt which is set over a second mobile support structure and perpendicular to the horizontal conveyor belt for receiving laminated products from the horizontal conveyor belt and partially rolling them, a second roller belt set on a third mobile support structure in an inclined plane under the horizontal conveyor for receiving partially rolled laminated products from the first roller belt and further rolling them, and a horizontal unloading belt, set on a lower part of the main support structure for unloading rolled products from the second roller belt.

2. The roller system of claim 1, further comprising a feed belt for transporting laminated products towards the conveyor belt.

3. The roller system of claim 2, wherein the feed belt has entrance and exit ends, and is trained about a plurality of tracking rollers, tensioned by a tensioning roller, and driven by a driver roller.

4. The roller system of claim 3, wherein the tensioning roller and the driver roller are set on an additional support structure, while the tracking rollers are distributed between the additional support structure and the main support structure.

5. The roller system of claim 4, wherein the tensioning roller is vertically displaced in a groove in a lateral wall of the additional support structure.

6. The roller system of claim 2, wherein the feed belt is set on an additional support structure which is pivotally connected to the main support structure near one end of the feed belt and can be tilted relative to the main support structure.

7. The roller system of claim 1, wherein the conveyor belt has an exit end opposite to an entrance end, and is trained about a plurality of tracking rollers, tensioned by a tensioning roller and driven by a driver roller.

8. The roller system of claim 7, wherein the tensioning roller is angularly displaced to tension the conveyor belt.

9. The roller system of claim 8, further comprising a servomotor for displacing the tensioning roller.

10. The roller system of claim 1, wherein the first roller belt is trained about at least two tracking rollers and driven by a drive roller.

11. The roller system of claim 10, wherein the second mobile support structure is supported on a longitudinal guide rail set over the main support structure for longitudinally moving the first roller belt in relation to the conveyor belt to set the distance between the first roller belt and the conveyor belt.

12. The roller system of claim 11, wherein the first roller belt travels at a different velocity and in a different direction than the conveyor belt.

13. The roller system of claim 11, wherein the first roller belt travels at the same velocity as the conveyor belt.

14. The roller system of claim 11, wherein the first roller belt travels at a different velocity than the conveyor belt.

15. The roller system of claim 11, wherein the first roller belt travels in a different direction than the conveyor belt.

16. The roller system of claim 11, further comprising a servomotor for moving the first roller belt in relation to the conveyor belt.

17. The roller system of claim 1, wherein the second roller belt has entrance and exit ends, is trained about a plurality of tracking rollers, and is tensioned and driven by a tensioning-drive roller.

18. The roller system of claim 17, wherein the entrance end of the second roller belt is higher than the exit end, below the conveyor belt, and in proximity to the first roller belt.

19. The roller system of claim 18, wherein the third mobile support structure is mounted on a vertical guide rail on the second mobile support structure, in such a way that the second roller belt moves vertically in relation to the first roller belt.

20. The roller system of claim 19, further comprising a servomotor for moving the second roller belt.

21. The roller system of claim 19, wherein the third mobile support structure is connected to the second support structure, in such a way that the second roller belt can be moved longitudinally as well as vertically.

22. The roller system of claim 1, wherein the unloading belt has entrance and exit ends, is trained about a plurality of tracking rollers, and is tensioned and driven by a tensioning-drive roller.

* * * * *